United States Patent [19]
Lawler

[11] 3,958,552
[45] *May 25, 1976

[54] TEMPERATURE CONTROLLED OVEN

[75] Inventor: Joseph A. Lawler, Flossmoor, Ill.

[73] Assignee: Blue M Electric Company, Blue Island, Ill.

[ * ] Notice: The portion of the term of this patent subsequent to Apr. 30, 1991, has been disclaimed.

[22] Filed: Apr. 24, 1974

[21] Appl. No.: 463,574

Related U.S. Application Data

[63] Continuation-in-part of Ser. No. 223,505, Feb. 4, 1972, Pat. No. 3,807,383.

[52] U.S. Cl. .............................. 126/247; 126/21 A
[51] Int. Cl.² .......................................... F24C 15/32
[58] Field of Search ............ 126/21 A, 247; 432/94, 432/219, 220, 221; 122/26

[56] References Cited
UNITED STATES PATENTS 3,439,665  4/1969  Stromqvist ..................... 126/21 A
3,807,383  4/1974  Lawler ............................ 126/21 A Primary Examiner—William F. O'Dea
Assistant Examiner—Larry I. Schwartz
Attorney, Agent, or Firm—Burmeister, York, Palmatier, Hamby & Jones

[57] ABSTRACT

Inherent heating of the air in an oven by a high-velocity recirculating blower is used as constant rate thermal energy source. Constant temperature is maintained by varying the rate of blending of source of cooler air with the heated oven air. Automatic control of temperature is provided by a variable vent operated by a thermal expansion bellows. The bellows is slightly responsive to ambient temperature to compensate for variations thereof.

6 Claims, 8 Drawing Figures

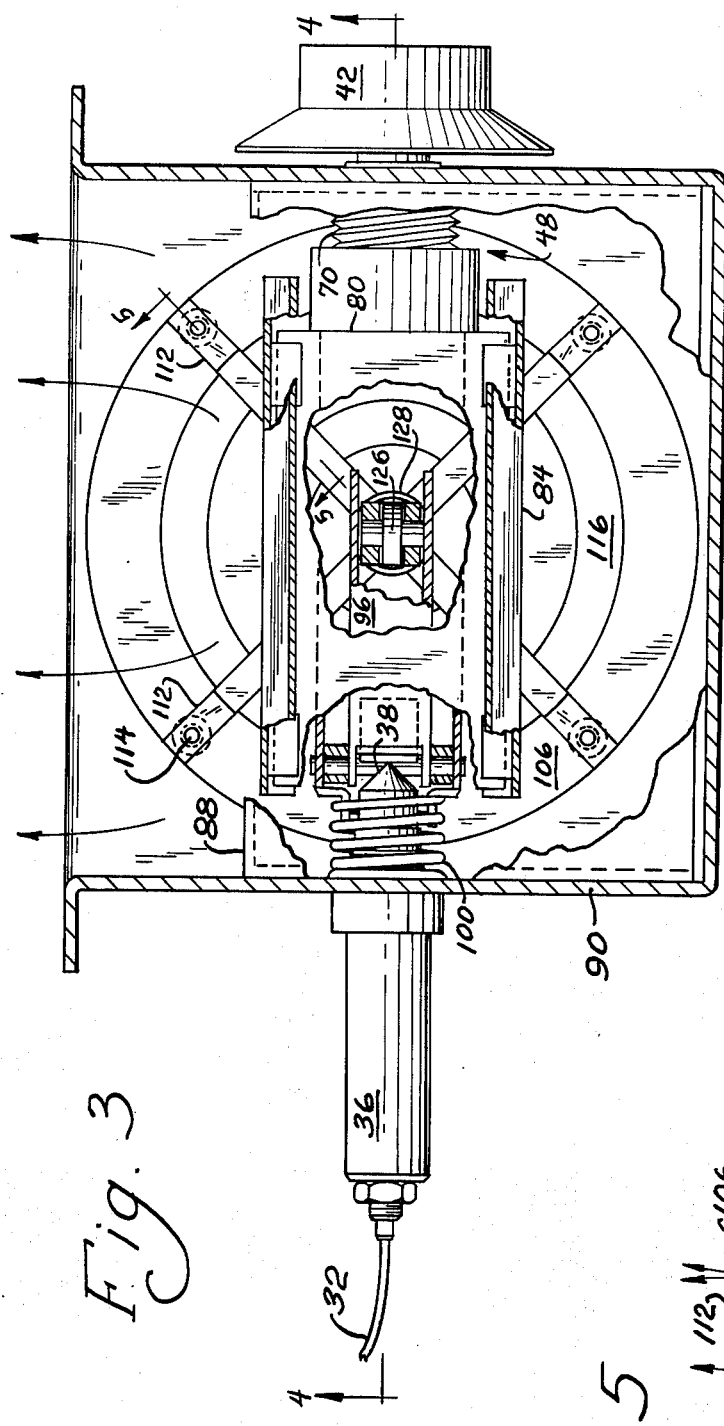
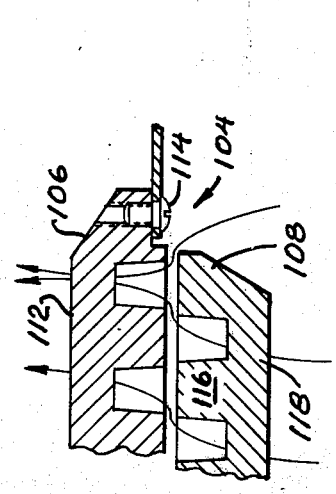
Fig. 3
Fig. 5

TEMPERATURE CONTROLLED OVEN

This application is a continuation in part of application Ser. No. 223,505, filed Feb. 4, 1972 now U.S. Pat. No. 3,807,383.

This invention relates to temperature-controlled ovens, particularly to ovens for use with substances presenting hazards of explosion and the like.

Severe problems are encountered in the employment of ordinary oven constructions in numerous applications presenting explosion and similar hazards. As a typical example, there may be considered the problems encountered in use of an oven in precision controlled-temperature aging or similar long term processing, or storage, of substances emitting explosive fumes or vapors. For a number of reasons now to be discussed, it has long since been found that ovens for such purposes have highly specialized requirements.

A fairly obvious and common requirement for an oven for chemical processing and similar uses, particularly where vapors or gases are emitted by the heating load, is a substantial rate of internal air circulation. (It will be understood, of course, that the term "air" is herein used for convenience, this being the normal atmospheric environment inside and outside an oven, the inclusion in this term of other gaseous environments occasionally employed being understood in connection with the present invention). Were such circulation not provided, the heat energy absorbed (or in some cases generated) in the reaction which is the purpose of the processing would create local temperatures in the region of the heating-load members defeating the basic purpose of the temperature control, in addition to other undesired effects. The circulation also serves a substantial purpose in connection with the explosion hazard, where such exists, since it prevents the accumulation of relatively undiluted hazardous vapors or gases. However where the dilution is not in itself sufficient to prevent an explosion hazard, i.e., where the concentration of the hazardous substance in the oven air is sufficient so that the mixture can explode or ignite, it becomes highly necessary to assure against the existence of "hot spots" to which the oven air may find access, in addition to the obvious requirement of being wholly assured against sparks and the like.

The maintenance of any given work-chamber temperature without having any portion of the interior of the oven at a considerably higher temperature is not a simple matter, and relatively complex and expensive structures have often been provided for minimizing the temperature differential between the work-chamber and other parts of the oven interior. As in any oven wherein uniformity of temperature in the work-chamber is an important characteristic, the heating of the oven air is normally done externally of the work-chamber in a suitable part of the oven enclosure forming a recirculation or air-return loop between the air-outlet and air-inlet portions of the work-chamber, the blower also normally being disposed here. With an explosion hazard present, however, this heating may not be done with exposed heating elements or other comparably simple structure, and substantial complication is often introduced in reducing the maximum temperature to which the oven air is exposed. In addition, of course, the precautions against sparking, etc., are of similarly high requirement.

Oven systems for such purposes must ordinarily be provided with some form of venting to constantly introduce fresh air and at the same time exhaust a fraction of the recirculating air, such provision being required to prevent excessive build-up of reaction products in the oven aside from explosion hazard. The explosion problem can of course be avoided despite the presence of high-temperature zones like heater elements, etc., if the rate of bleeding-in of fresh air is sufficiently high so that a mixture of reaction products and air is never adequately rich to be ignited. Thus one known alternative for complexity of construction is substantial abandonment of the recirculation of oven air, fresh air being constantly drawn in from the exterior, heated to the requisite temperature, flushed through the work-chamber and thereupon exhausted with the reaction products. Such a "once-through" system requires relatively large heating elements and heating power even for relatively low temperatures, in addition to the fact that closeness of control of temperature, and uniformity of the temperature throughout the volume, are more difficult to obtain than in the case of recirculated air maintained within the enclosure.

A further, but related, difficulty heretofore encountered in controlled-temperature ovens for these and similar purposes is inability, in any simple manner, to achieve the maintenance of relatively low temperatures of the recirculated air. Where the temperature is controlled by varying the power to heating elements, whether in proportional control or on-off cycle control, effective control cannot be obtained in the temperature region where the total required heat input rate is of the same order as the variation of the heat-transfer variables, such as reaction rates in work-pieces, which produce temperature variations for which automatic compensation is to be effected. Where a high-velocity blower is employed for circulation, it is found that control by heater-power variation becomes erratic and ineffective at temperatures considerably higher than ambient temperatures due to air-heating by the blower. To deal with this problem where temperatures only moderately above ambient temperature are wanted, various devices have heretofore been used such as the addition of a refrigerating unit in addition to a heater unit, thus extending the lower end of the temperature control range.

The present invention flows from recognition that the heating of the air produced by blower operation, heretofore occasionally observed merely as a problem requiring complication in achieving relatively low control temperatures, has unique advantages as opposed to other methods of heating when itself employed as the heat source in an oven for purposes such as those above described, particularly in applications presenting safety hazards. Most methods of heating of air, such as by resistance elements and the like, employ the physical phenomenon generally known as heat transfer, which requires that the body or element which heats the air be at substantially higher temperature than the air being heated. Where, in accordance with the present invention, the heating of the air is accomplished by friction and pressure phenomena such as those occurring at the blades of a blower, the necessity for such a differential does not exist. Thus the air itself can be made the highest temperature portion of the system. With this possibility, obtained from the nature of the basic process by which heat is imparted to the air, elaborate provisions for assuring against "hot spots" are eliminated without impairing the safety of permitting relatively high concentrations of hazardous reaction products to be present in the recirculated air.

Further, a constant speed blower constitutes a heat energy source which imparts heat to the air it moves at a constant rate. This is particularly true when driven by an alternating current motor, since the speed of the motor is independent of the amplitude of the supply within its operating range and the supply frequency is usually accurately held constant. The blower may be utilized as the sole heat source, as described in the inventor's prior patent Ser. No. 223,505, or used in conjunction with other constant heat energy source as described herein. The fact that a constant rate heat energy source is used permits employment of a relatively small but adjustable fresh-air bleeding-rate for controlling oven temperature.

In theory, the temperature of an oven employing the inherent blower heating as the heat source might be adjusted and controlled by varying blower speed or some similar parameter. A simpler and more economical, as well as more accurate, control is achieved in accordance with the invention by employing a constant rate thermal energy source and varying the rate of bleeding-in of ambient air (and of course bleeding-off of oven air) in accordance with the oven temperature.

The invention, in implementation of the broader aspects discussed above, additionally provides novel construction features for accurate and sensitive variable-venting temperature controls, for these and similar purposes, wherein the vent remains closed until the preset temperature is closely approached, whereupon the vent commences to open until the equilibrium temperature is reached. A simple type of temperature transducer is employed, with a relatively small, but nevertheless appreciable, exposure to ambient temperature, in addition to the exposure to oven temperature to which it is primarily responsive, so that ambient temperature variations are minimized in effects on oven temperature.

The above aspects of the invention, as well as certain further ones, will best be understood by reference to the embodiments illustrated in the drawing, in which:

FIG. 3 is an enlarged sectional view of the temperature control of the oven of FIG. 1, taken along the line 3—3 of that Figure and of FIG. 4;

FIG. 5 is a fragmentary enlarged view taken along the line 5—5 of FIG. 3;

Figure 1:
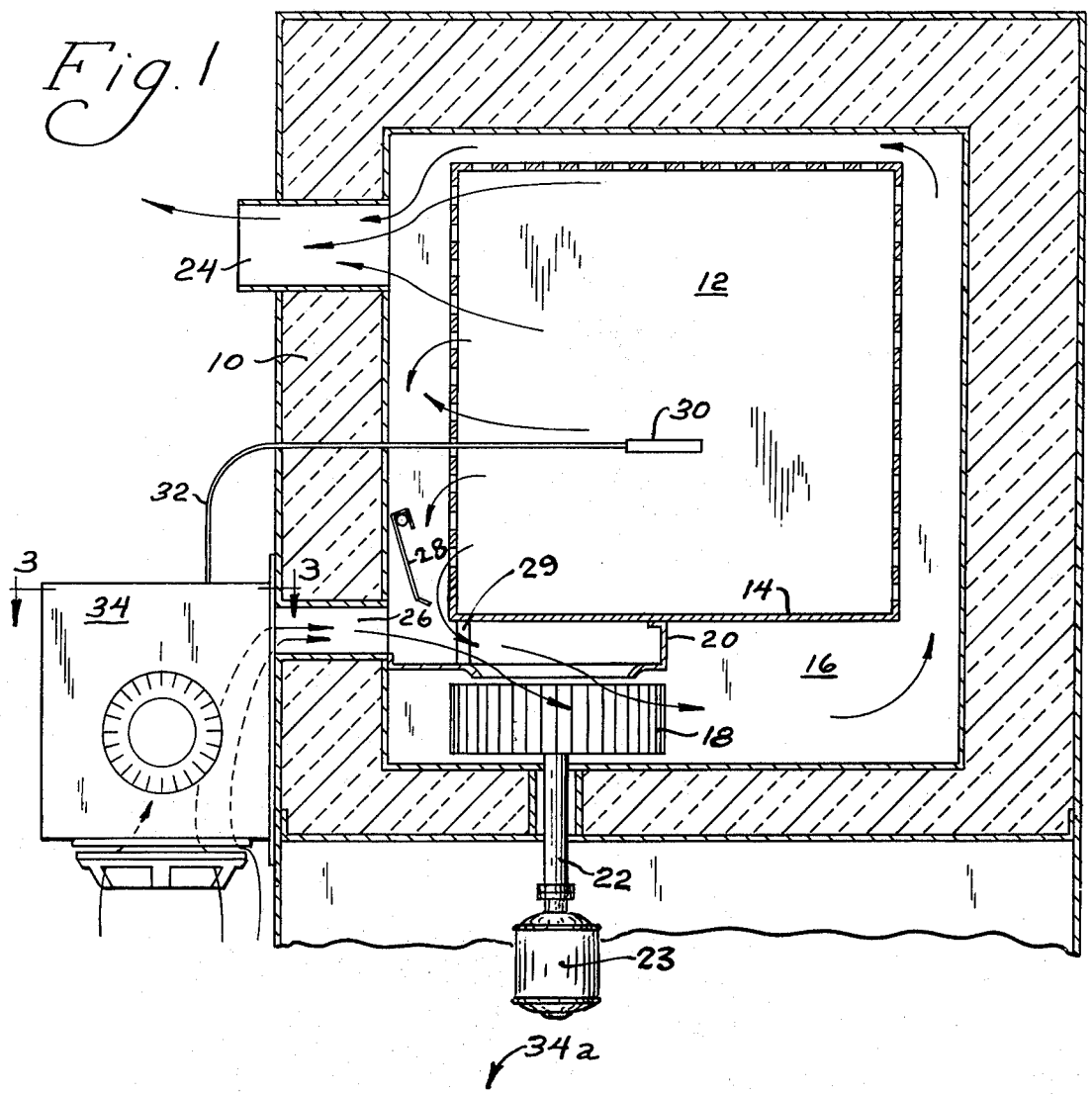
FIG. 1 is a schematic sectional view of a temperature-controlled oven incorporating the invention.
Figure 7:
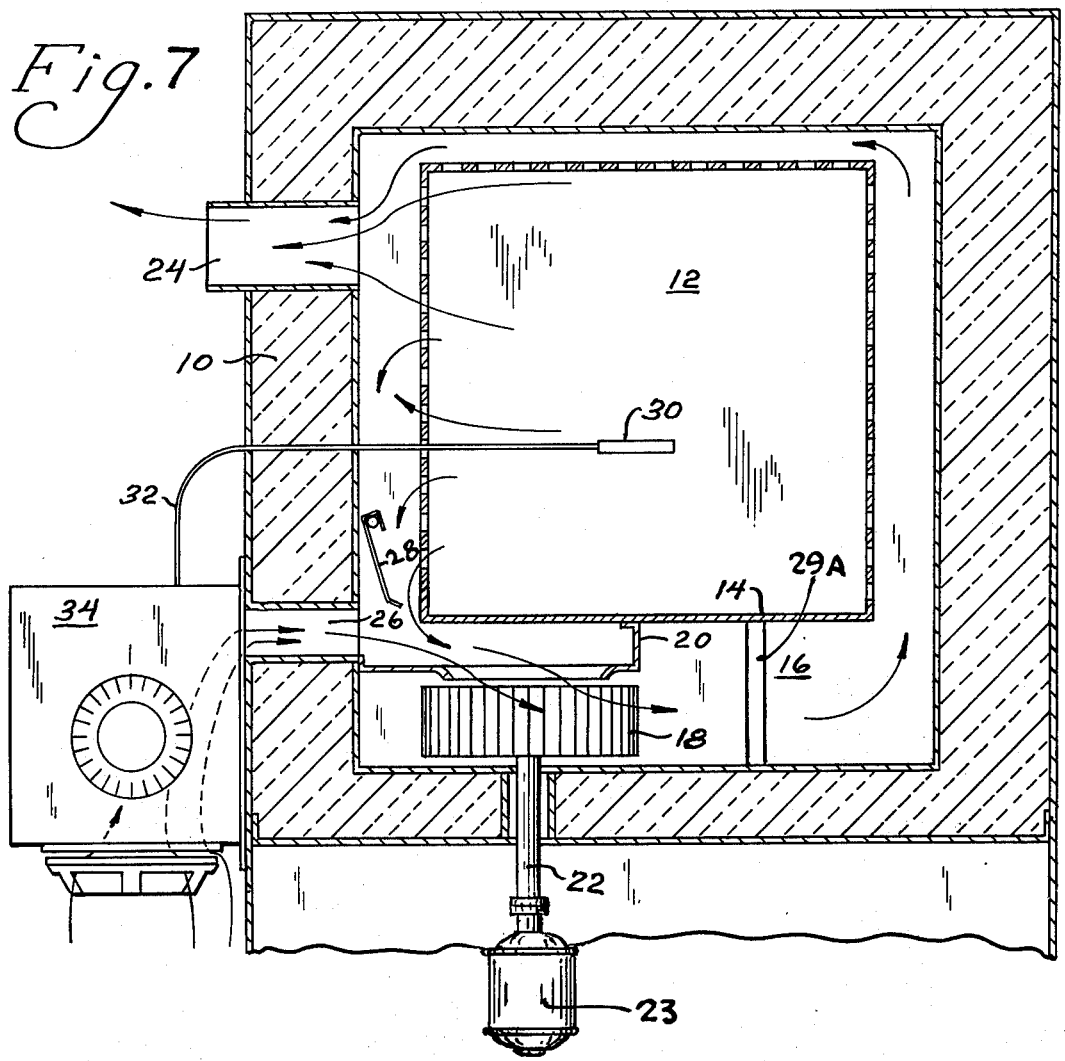
Figure 8:
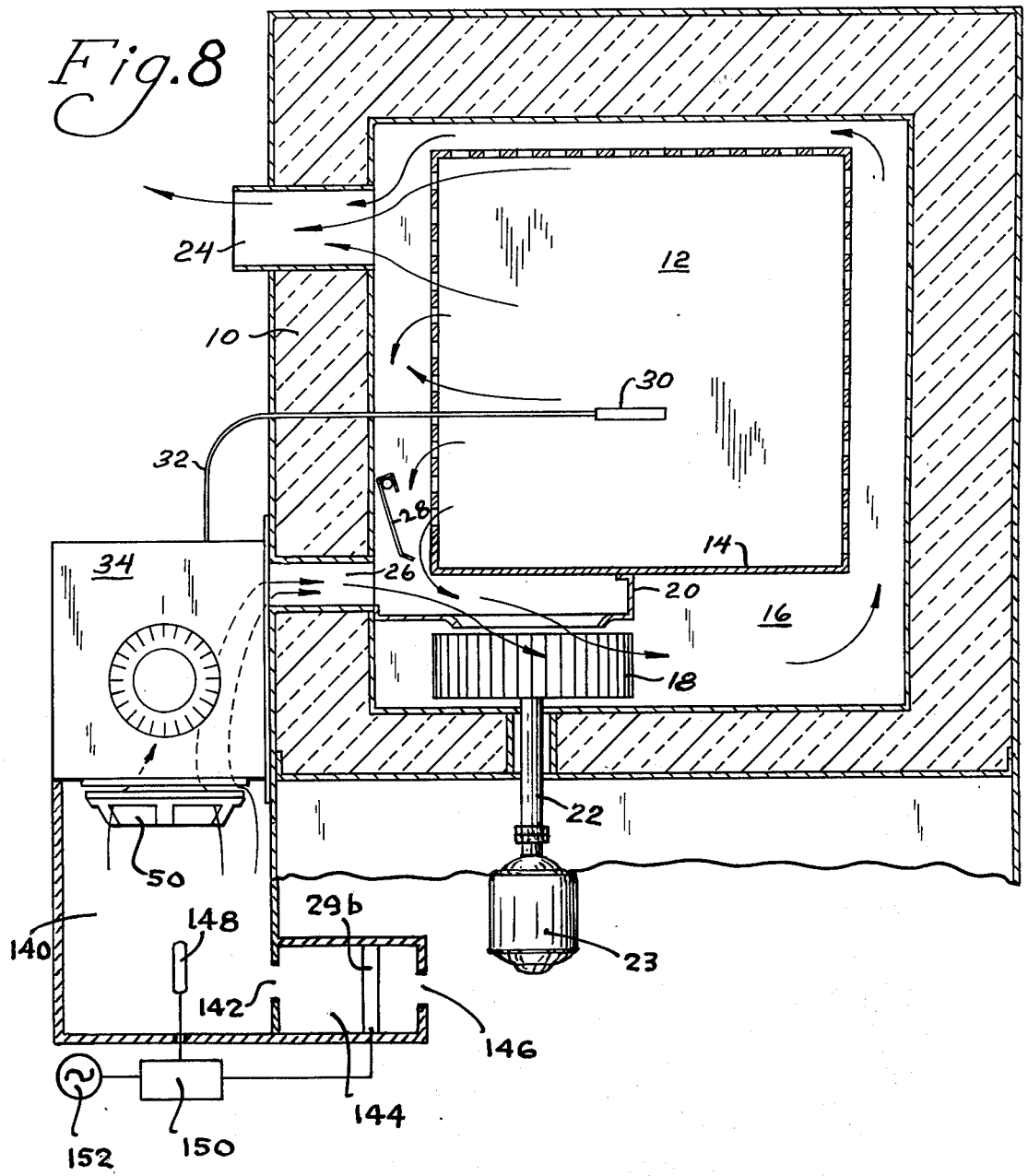

FIG. 7 is a fragmentary sectional view of a temperature controlled oven which constitutes a further embodiment of the present invention taken on a plane corresponding to that of FIG. 1 in the foregoing embodiment; and FIG. 8 is a fragmentary sectional view of a temperature controlled oven which constitutes a still further embodiment of the present invention also taken on a plane corresponding to FIG. 1.

Except for the manner of heating and maintaining fixed temperature, the oven of FIG. 1 is of conventional construction and thus is only schematically shown. The outer wall or enclosure 10 is of a usual thermal-insulated construction sealed against air-leakage except at the vents later mentioned. The work-chamber 12 (to which access is provided by the oven door, not shown) is formed of suitably perforated sheet metal except for the imperforate floor portion 14, below which is a lower internal region 16 of the oven forming a return path for the generally horizontal circulation of air through the work-chamber 12. Air circulation is provided by a high-velocity centrifugal blower 18 associated with a sheet metal duct or hood 20 which forms the air inlet for the blower, returning the work-chamber exit air to the blower for recirculation. The blower shaft 22 is externally driven by a constant-speed alternating current motor 23 mounted below the blower. The motor 23 is external of the oven, which accordingly contains no electrical components.

If so desired, because of external explosion hazards or the like, the blower may be driven by an air-motor or similar non-electrical drive. The blower blades are of course somewhat heated by the air friction, and an equilibrium temperature rise of the blades occurs which is dependent on design of the particular blower employed, and may readily be made sufficiently small to make blade temperature a negligible factor in the operation.

An air outlet vent 24 is provided through the upper portion of the air-exit end of the enclosure 10 and an air inlet vent 26 through the lower portion. Slightly above inlet vent 26 is a vane or damper 28 which forms an adjustable constriction in the air-flow path between the exit end of the chamber 12 and the inlet duct 20 to the blower 18. Opening of such a damper to any predetermined degree has heretofore been used to control the rate of replacement or renewal of the recirculating air. In employment of the present invention, the damper 28, where one is provided, is placed in a predetermined partially-open fixed position to produce a small pressure difference between the inlet and outlet vented portions of the recirculation system.

As earlier discussed, such an oven is conventionally automatically controlled in temperature by varying the power supply to heating elements. In accordance with the present invention, however, heating elements, or cooling elements, are either not used, or are operated under constant power conditions to produce a constant thermal output in order to permit temperature control of the oven as set forth herein at temperatures not within the range of heating by the blower alone.

As illustrated in FIG. 1, the constant rate thermal energy source is the high-capacity blower and a thermal element 29 located at the intake of the blower 18. The thermal element 29 must achieve a thermal output of approximately constant rate within the temperature control range of the oven. The thermal element 29 may be the evaproator coils of a refrigeration system which will be effective to reduce the temperature of the air entering the blower 18 to a temperature below the desired oven temperature, thereby permitting the high-capacity blower generated heat and the ambient air entering through the opening 26, which may be either above or below the temperature of the oven, to control the temperature of the oven. The thermal element 29 may also be a heat source, such as electrical resistance elements driven by a relatively constant current source of electrical energy. The thermal energy generated by the resistance elements of the thermal element 29 will be added to the thermal energy generated by the high-capacity blower, thereby achieving a temperature in the oven 12 above the desired oven temperature and permitting control of the temperature to be achieved by introducing cooler ambient atmosphere through the inlet vent 26.

Temperature control is effected by automatic control of the venting, thus controlling the rate of blending of ambient-temperature air with the recirculated air in the oven. For this purpose, there is attached to the inlet vent at 26 a control mechanism responsive to the temperature sensed by the bulb 30 of a thermal-expansion temperature transducer having a capillary tube 32 connected as hereinafter described to an external control assembly 34.

Figure 2:
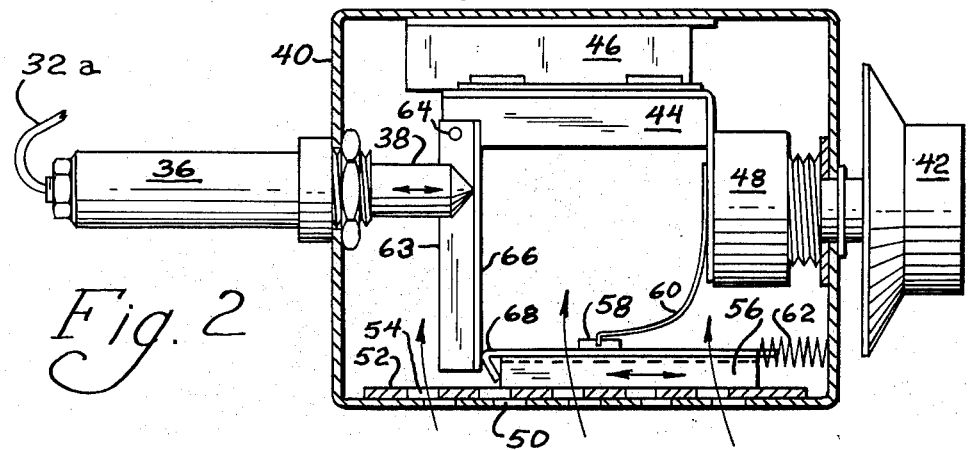
FIG. 2 is a more or less schematic view of a temperature control assembly illustrative of the principle of operation of the temperature control of the oven of FIG. 1.
Figures 4, 6:
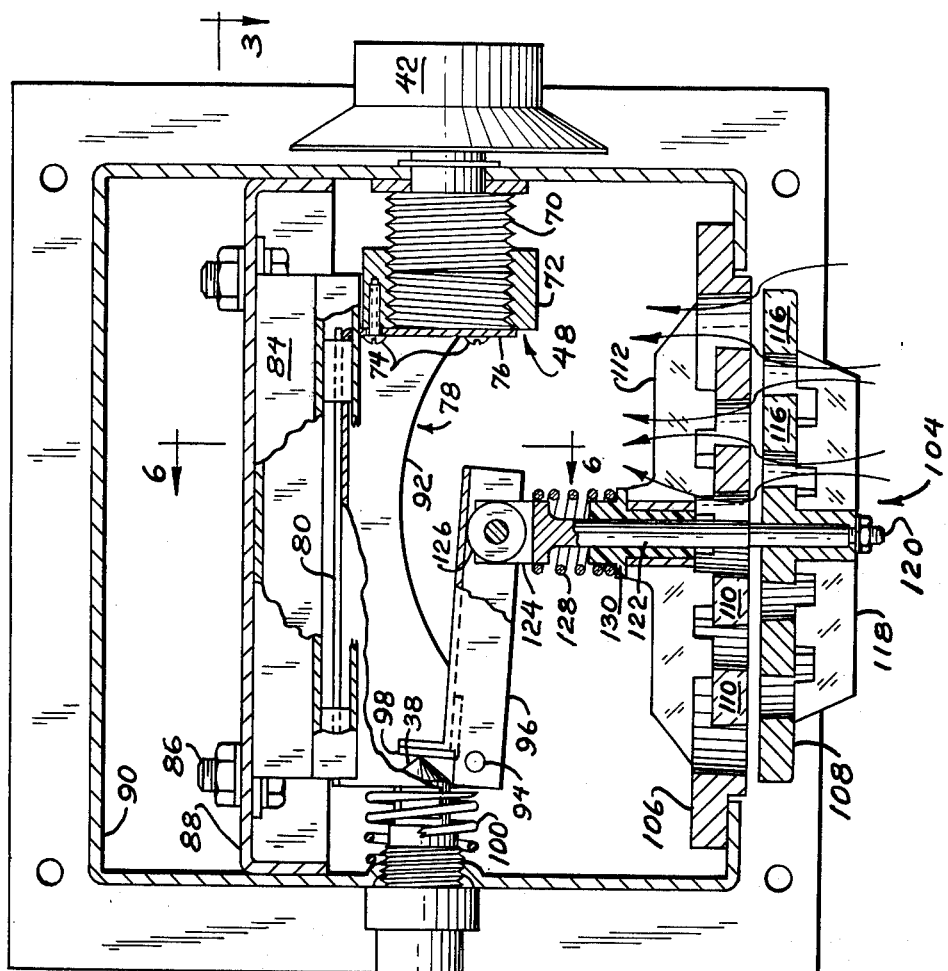
FIG. 4 is a sectional view taken along the line 4—4 of FIG. 3.
FIG. 6 is a fragmentary sectional view taken along the line 6—6 of FIG. 4.

There is shown in FIG. 2 a control assembly 34a lacking certain refinements of the assembly 34 shown in FIG. 1, later to be described in detail, but illustrative of the principle. As shown in FIG. 2, the capillary 32a terminates in the outwardly extending casing of a bellows assembly 36 having a plunger or actuator 38 internally of the hoousing 40 of the control. At the opposite end of the housing 40 is a calibrated knob-and-dial 42 which positions a carriage 44 longitudinally on a horizontal track 46 by means of a screw mechanism 48.

The bottom of the housing 40 has transverse slots 50. A slide-plate 52 with lots 54 spaced in correspondence with the slots 50 abuts the bottom and is affixed to a suitable web or carriage 56, which slides under a shoe 58 mounted on the carriage 44 by mens of a leaf-spring 60 which thus holds the slide-plate 52 in abutment against the bottom of the housing. A compression spring 62, acting between the housing and the carriage 56, urges the latter to a limit position (leftward of the partially open position shown in the drawing) wherein the slots 50 are wholly closed by the plate 52.

A lever or arm 63 has its upper end pivoted at 64 on the carriage 44 and has a transversely extending portion 66 in the path of motion of the plunger 38 of the bellows assembly. The lower end of the lever 62 is abutted by an extending portion 68 on the carriage 56 of the slide-plate.

The control assembly is illustrated in FIG. 2 in a partially open condition of the venting slots representing an equilibrium oven temperature indicated by an appropriate calibration marking on the knob-and-dial 42. Any increase or decrease in temperature within the oven results in motion of the plunger 38 in the direction to increase or decrease the admission of ambient air and thus compensate for whatever change in conditions produced the change in oven temperature, such as a thermal effect produced by the work-material being aged or otherwise processes or stored. In start-up from a cold condition, the plunger 38 is withdrawn and the slotted inlet is entirely closed, the lower end of the lever 62 being in the slightly clockwise position produced when the carriage 56 and slide-plate 52 are at the limits of their leftward motion. The venting slots commence to open only when the preset temperature is approached, at which point the lever 62 is engaged by the plunger 38 which then further advances until the preset temperature equilibrium is reached. By employment of the lever system with a variable vent producing an extremely large variation of resistance to air flow with small mechanical motion, there is achieved substantial accuracy of maintenance of the preset temperature despite substantial variations in, for example, exothermic or endothermic reaction rates in materials constituting the temperature-control load.

Variation of the preset temperature is accomplished by operation of the control knob to move the carriage 44 along the track 46. The external location of a small portion of the capillary tube 32a and the casing of the transducer produces a relatively small, but appreciable, response of the expansion state of the transducer fluid to ambient temperature, thus closely compensating for changes in ambient temperature, which are in any event normally small in the environments in which such ovens are used.

For any given extension of the plunger 38, motion of the pivot 64 in the direction of retraction of the plunger (leftward in FIG. 2) further opens the slots by compression of the spring 62 and motion of the pivot 64 in the direction of further extension of the plunger 38 (rightward in FIG. 2) closes the slots, if change of setting is made after an equilibrium such as shown in FIG. 2 already exists. If change of setting is made in the cold condition, the temperature at which the slots will start to open is altered by the resetting, but the opening does not commence, at any temperature setting, until there is reached an oven temperature only slightly below the set temperature. For each preset temperature, equilibrium is of course reached at a slightly different condition of openness of the vents or slots i.e., a slightly different position of the slideplate 52, but this difference is very small compared to the difference in positions of the carriage 44 which correspond to the respective equilibrium temperatures.

There is shown in FIGS. 3 through 6, in greater detail, an improved and preferred construction for the control assembly 34 of the oven system of FIG. 1. The bellows assembly 36 with its plunger or piston 38 and the knob-and-dial 42 are as in the previous embodiment, and a similar screw mechanism 48 is employed in connection therewith, a large-diameter screw 70 attached to the knob engaging an internally threaded sleeve 72 affixed by bolts 74 to a plate 76 secured to the end of the carriage 78. The carriage comprises a plate 80 having slideshoes 82, of nylon or the like, on laterally opposite edges, the latter being slideable in opposed recesses formed in a shaped sheet metal track 84 bolted at 86 to an internal bracket 88 extending between the ends of the interior of the housing 90.

On the underside of the sliding plate 80 are spaced depending webs 92 which are affixed at one end to the plate 76, and between which extend, at the opposite end, the pivot pin 94 of a lever 96. The lever extends generally horizontally but has an upward extension tab or striker 98 at the pivoted end, in the path of the plunger 38. A spring 100 compressed between the housing 90 and ears 102 on the carriage 78 prevents backlash of the screw mechanism 48, assuring accurate reproducibility of carriage position with dial setting.

A variable vent generally indicated at 104 is formed of a stationary inner portion 106 and a reciprocable outer portion 108. The stationary portion is in the form of radially spaced concentric rings 110 maintained in this relative position by four radial webs 112, this assembly being mounted by screws 114 in a large aperture in the bottom of the housing 90. The reciprocable portion 108 is similarly formed of concentric rings 116, maintained in relative position by radial webs 118. The reciprocable assembly is centrally secured at 120 to a drive-rod 122 which extends up through the axis of the stationary portion 106 and has mounted at its upper end a yoke 124 bearing a roller-wheel 126 which contacts the lever 96. A compression spring 128 urges the rod 122 upward, acting between the corners of the yoke 124 and a shouldered nylon bearing-sleeve 130 lining the hub of the stationary portion 106 for free sliding motion of the drive rod 122.

In general, the operation of the control of FIGS. 3 through 6 is similar to that of the more elementary form of FIG. 2 already described. However substantial advantages are obtained. The concentric rings 110 of the stationary portion are offset radially from the concentric rings 116 of the reciprocable portion, the latter being opposed to, and of radial thickness only slightly greater than, the radial width of the annular spaces between the rings 110. In the closed position (not shown) a substantially entire blockage of air is readily achieved with reasonably smooth surface finishes at the contacting edges of the rings. The rate of change of air resistance with inward or outward motion of the reciprocable portion 108 is extremely high in the region adjacent to complete closure, so that very small motion produces a large variation of oven air intake. This variable vent structure, in addition, has very small resistance to air-flow for the area occupied when the vent is only moderately opened in position. These operational advantages are obtained with structure which is relatively simple and inexpensive to fabricate, as well as reliable and trouble-free in operation. For comparable sensitivity to motion, a sliding-surface construction like that of FIG. 2 will be seen to require a very large number of very small apertures in the movable and stationary parts of the vent. Such a construction is not only difficult and expensive to fabricate, but may be shown to be incapable of reaching the low values of unit-area air-flow resistance which can be obtained where the motion producing the variation in air admission is reciprocating motion in the direction perpendicular to the abutting apertures surfaces, rather than motion in which one apertured member slides on the other. In addition, the variable vent structure of FIGS. 3 through 6 requires very little attention by way of cleaning or other maintenance, the self-cleaning action of high-velocity air flow preventing any accumulation of dust or the like.

In the closed position of the vent, the lever 96 is substantially parallel with the path of motion of the plunger 38, which is in turn substantially parallel with the track 84 along which the carriage 78 is moved for temperature adjustment. Since the roller 126 supports the lever 96 in this parallel condition when the vent is closed, temperature adjustment prior to start-up does not alter the rotational position of the lever 96 about its pivot 94. Accordingly (as is not the case in the structure of FIG. 2) the point at which the plunger 38 engages the tab or striker 98 to commence opening of the vent after start-up varies in exact correspondence with the position of the carriage, i.e., the distance of advancement or retraction of the carriage produces substantially exactly the same difference in extension of the plunger 38 at which opening of the vent commences. Since plunger extension is essentially linear with temperature, and since the further advancement of the plunger after opening commences until equilibrium is reached is relatively negligible as compared with the plunger travel prior to engagement of the striker, temperature calibration of the dial 42 is free of non-linearities which can arise from this source where the position of the lever with respect to its supporting carriage is substantially altered by the setting of temperature in the cold condition of the oven, as in FIG. 2.

The manner of overall operation and the advantages of the oven system illustrated in the drawing will be obvious from the earlier general description of the invention, without necessity for repetition. In one construction, a two-horsepower centrifugal blower was employed in a well-insulated and well-sealed cabinet-type oven. With the thermal element inactivated and vents fully closed (i.e., the venting control disabled), a temperature of 235°C. was obtained. Closely controlled temperatures up to 210°C. were preset and maintained. The lower end of the controlled-temperature range is determined largely by the freedom of air-flow in the maximum open position of the vent. With a sliding-plate construction such as that of FIG. 2, the air-flow in the fully open position remained sufficiently restricted so that the minimum temperature obtainable was, with the particular oven construction, 38°C. under ordinary room-temperature external conditions. With the variable vent construction shown in FIGS. 3 through 6, however, although of generally the same cross-sectional area, the resistance to air-flow in the open condition was sufficiently small to permit close approach to room-temperature at the lower end of the calibrated scale of the temperature control. With heat at a constant rate from the thermal element 29, temperatures above 210° may be controlled. With the thermal element in the form of a resistance element, a constant current source, not shown, may be utilized to inject heat into the circulating system at a constant rate, thereby permitting the blower 18 to raise the temperature in the oven to temperatures in excess of 210° and still maintain control by controlling the flow of air entering the inlet port 26 as indicated above.

In like manner, temperatures below the control range of the blower alone may be controlled by utilizing the evaporation coil of the refrigeration system as the thermal element 29. With the ordinary room temperatures of 38°C. prevailing, temperature control may be achieved at 0°C. be removing a constant rate of heat from the circulating system through the thermal element 29 and controlling the air intake through the inlet port 26 as set forth above, opening the vent adding heat to the system.

It will be observed that in addition to the advantages earlier stated, the invention provides safeguards against hazards arising from blower failure. Where a blower is employed in a construction where the air is separately heated, cessation of operation of the blower results in abnormally high temperatures particularly in the region of the electrical or other heating elements. This hazard may of course be eliminated by provision for sensing the cessation of blower operation and shutting off the heating power in response thereto; but in addition to the complexity thus introduced, safety remains reliant upon the proper operation of this safety equipment. In the present invention, all such hazards are eliminated without any auxiliary provision whatever, blower failure inherently eliminating the heat source. This safety aspect makes the invention highly advantageous even for uses where explosion or other excessive-temperature hazards do not result from emission of fumes or vapors by the load, but are inherent in the load itself, for example in testing or processing of sealed containers of explosive material such as ammunition, cartridges of solid fuel, and the like. If so desired, the blower speed may be selected to produce any preselected maximum temperature even in the case of complete failure or blocking of the venting.

FIG. 7 illustrates a modified construction of a temperature controlled oven from that set forth in FIGS. 1 through 6. In the construction of FIG. 7, the thermal element 29 is disposed at the outlet side of the blower 18 and designated by the reference numeral 29a, rather than being positioned at the inlet side of the blower 18. Other portions of the embodiment of FIG. 7 are identical to that set forth for the embodiment of FIG. 1, and identical reference numerals have been used for like elements. Positioning the thermal element 29a, which may be either a heating or refrigerating element, at the outlet side of the blower 18 increases turbulence in the outlet portions of the blower and reduces turbulence at the inlet where the passages are of smaller cross section.

FIG. 8 illustrates still a further embodiment of the present invention. In FIG. 8, only the blower 18 is located in the circulation path of the air within the oven 12, but the temperature of the air entering through the inlet port 26 is itself controlled in order to give the oven a range of control temperatures in excess of the range which can be achieved by the blower alone vented to ambient atmosphere. In FIG. 8, identical elements with that of FIG. 1 are given the same reference numerals.

As illustrated in FIG. 8, the control assembly 34 is in communication with the inlet port 26 of the oven, and the control assembly 34 has its inlet in the form of the slots 50 in communication with a plenum chamber 140. The plenum chamber communicates through an opening 142 to a furnace 144 which contains a thermal element 29b. The furnace 144 also has an inlet port 146.

The thermal element 29b may be either a refrigerating element or a heating element. Assuming the thermal element 29b to be a heating element in the form of electrical resistance elements connected to a constant current electrical power source, air entering through the inlet port 146 will pass through the heating thermal elements 29b of the furnace 144, through the opening 142 and into the plenum 140. The flow of air into the plenum 140 is controlled by the demand established by the blower 18 and the control unit 34, and a constant flow of air through the control unit 34 and the inlet vent 26 of the oven must be maintained to control the temperature of the oven. Since the air entering the inlet vent 26 through the control unit 34 is elevated in temperature above the ambient temperature, the heat added by this flow of air will be added to the heat generated by the turbulence of the blower 18, thereby maintaining temperature in the oven 12 greater than that which could be achieved by the blower alone. However, since the quantity of heat entering through the inlet port is a function of the quantity of air passing through the controller, the temperature of the oven 12 is very responsive to changes in flow rates through the control unit 34 unless the temperature of the plenum 140 is near that of the oven.

In addition, the temperature of the air in the plenum 140 is preferably maintained at a constant temperature. For that purpose, a thermal responsive element 148 is positioned in the plenum and connected to a control unit 150 in the form of an electrical switch. The control unit 150 is connected between the alternating current source 152 and the resistance elements of the thermal element 29b. If the plenum 140 is sufficiently large compared to the flow rate of air through the control unit 34, the air in the plenum will appear to the oven as the ambient atmosphere appears in the embodiments of FIGS. 1 and 7.

Many alterations and variations of the illustrated overall oven construction will readily be devised. For example, for applications highly critical as to composition or purity of the oven atmosphere, or for uses in contaminated environments, intake of surrounding environmental air may be undesired, and the air intake may be from a suitable sealed container of air (the broad meaning of which term as herein used has already been referred to) which is accordingly equivalent to ambient air for this purpose. As another example, it may be desired to produce relatively high temperatures in a work-chamber with only moderate internal air velocity, as where the work-load consists of exposed powders or the like. In such a case, there may be provided an auxiliary air-path within the oven by-passing the work chamber for permitting the use of a very high-capacity blower producing the requisite rate of heat input while flowing only a small fraction of the recirculated air through the work-chamber. Such a construction permits the obtaining of temperatures of the order of 300°C. to 500°C. with only moderate air velocities in the work-chamber.

Although the invention is of greatest utility, as regards safety from explosion and the like, where no heating means are present which can create a hazard due to carelessness of an operator or malfunction of the oven equipment, the addition of auxiliary heating means is permissible where such risk is acceptable. For example, if it is desired to speed the reaching of equilibrium temperature in start-up, the heating by the blower may be temporarily supplemented by electrical heating elements in this portion of the operation, just as is now conventional for similar purposes where relatively small electrical heating elements are employed for maintaining preset temperature once reached, the auxiliary heating elements being disable manually or automatically once their function has been served.

Accordingly, the scope of the protection to be afforded the invention should not be limited to the particular embodiments illustrated and described herein, but should extend to all use of the teachings of the invention, as defined in the appended claims.

What is claimed is:

1. A temperature-controlled oven comprising, in combination:
    a. an outer thermal-insulation leakage-sealed housing,
    b. an inner chamber within the housing adapted to receive bodies to be maintained at constant temperature and having air-inlet and air-outlet portions,
    c. air-recirculation means within the housing adjacent to the inner chamber including a constant-speed air-blower and air-duct means guiding outlet air from the chamber back to the inlet portion,
    d. a heat energy source in addition to the air-blower disposed exterior of the chamber and within the air-recirculation means for changing the thermal content of the air in the recirculation means at a fixed rate,
    e. an air inlet vent and an air outlet vent through the housing in regions of differing internal air pressure, the housing being sealed against leakage, said vents continuously blending air from exterior of the housing into the recirculated air, said exterior air being at a temperature different than the inner chamber, and f. means on at least one of said vents responsive to the chamber temperature to vary the rate of blending of exterior air.

2. The improved oven of claim 1 including means responsive to the ambient temperature to vary the rate of blending of ambient air, the change of blending-rate with change of ambient temperature being small compared to the change of blending-rate with change of chamber temperature.

3. The improved oven of claim 2 wherein the blending-rate varying means comprises a thermal-expansion temperature transducer having a portion exposed to chamber air and a portion exposed to ambient air and an actuator positioned in response to the temperature transducer.

4. The improved oven of claim 3 wherein the varying means comprises a spring maintaining the air-inlet vent in a normally closed position, a lever coupled to the actuator and the vent to open the vent in response to actuation by the actuator, and manually operable means to set the relative position of the transducer and the lever to thus set the oven temperature.

5. A method of producing preselected temperature in an oven comprising continuously recirculating the oven air within the oven, continuously changing the thermal content of the recirculated air at a constant rate, continuously blending a small amount of ambient air with the oven air, and continuously varying the blending-rate in response to changes in oven temperature.

6. The method claim 5 further characterized by additionally varying the blending-rate in response to changes in ambient temperature, the variation of blending-rate with change of ambient temperature being small compared to the change of blending-rate with change of oven temperature.

* * * * *